(12) United States Patent
Archambault et al.

(10) Patent No.: US 7,559,607 B2
(45) Date of Patent: Jul. 14, 2009

(54) ADJUSTABLE ERGONOMIC BACK FOR A SEAT

(75) Inventors: Bruno Archambault, Sherbrooke (CA); Maxime Laplante, Sherbrooke (CA); Michael Proulx, Sherbrooke (CA); Claude Thérer, Ascot (CA); André Albert, Sherbrooke (CA); Gilles Bernat, Sherbrooke (CA); Pierre Larivière, Sherbrooke (CA); Germain Bélanger, St-Germain-de-Grantham (CA)

(73) Assignee: Baultar I.D. Inc., Windsor, QC (CA)

( * ) Notice: Subject to any disclaimer, the term of this patent is extended or adjusted under 35 U.S.C. 154(b) by 371 days.

(21) Appl. No.: 11/311,424

(22) Filed: Dec. 20, 2005

(65) Prior Publication Data

US 2006/0152062 A1    Jul. 13, 2006

(30) Foreign Application Priority Data

Dec. 20, 2004   (CA)  .................................. 2491299

(51) Int. Cl.
*A47C 3/00*   (2006.01)
*A47C 7/14*   (2006.01)

(52) U.S. Cl. ................ 297/284.7; 297/284.3; 297/284.6

(58) Field of Classification Search .............. 297/284.3, 297/284.6, 284.7
See application file for complete search history.

(56) References Cited

U.S. PATENT DOCUMENTS

| | | | |
|---|---|---|---|
| 4,944,554 A * | 7/1990 | Gross et al. .............. | 297/284.3 |
| 4,965,899 A * | 10/1990 | Sekido et al. ............ | 297/284.6 |
| 5,120,109 A * | 6/1992 | Rangoni ............... | 297/284.3 X |
| 5,558,398 A * | 9/1996 | Santos ...................... | 297/284.3 |
| 5,562,324 A * | 10/1996 | Massara et al. .......... | 297/284.6 |
| 5,772,281 A * | 6/1998 | Massara ............... | 297/284.6 X |
| 6,578,916 B2 * | 6/2003 | Longhi et al. ............ | 297/284.3 |

FOREIGN PATENT DOCUMENTS

| | | |
|---|---|---|
| WO | WO 97/30613 A1 | 8/1997 |
| WO | WO 98/42234 A1 | 10/1998 |
| WO | WO 98/53723 A1 | 12/1998 |
| WO | WO 98/58566 A1 | 12/1998 |
| WO | WO 99/55200 A1 | 11/1999 |
| WO | WO 01/70075 A1 | 9/2001 |
| WO | WO 02/01988 A2 | 1/2002 |
| WO | WO 03/011634 A1 | 2/2003 |
| WO | WO 03/039300 A1 | 5/2003 |
| WO | WO 03/068557 A1 | 8/2003 |
| WO | WO 2004/089693 A3 | 10/2004 |

* cited by examiner

*Primary Examiner*—Anthony D Barfield
(74) *Attorney, Agent, or Firm*—William E. Beaumont

(57) ABSTRACT

An adjustable ergonomic back for a seat is disclosed. The back has a plurality of back cushions, each cushion having at least one adjustment area. It further comprises a structural shell having a plurality of voids therein. A plurality of thin flexible elements are located between the back cushions and the structural shell, each flexible element being attached to the structural shell. Each of the flexible elements has a front surface and a back surface, the front surface being in contact with a respective adjustment area of one of the plurality of back cushions. The back further has a plurality of actuators located between the flexible elements and the structural shell, each of the actuators being in contact with one of the respective back surfaces of the flexible elements and exerting a pressure on the back surface.

20 Claims, 5 Drawing Sheets

ADJUSTABLE ERGONOMIC BACK FOR A SEAT

RELATED APPLICATIONS

The present application is based on, and claims priority from, Canadian Application Number 2,491,299, filed Dec. 20, 2004, the disclosure of which is hereby incorporated by reference herein in its entirety.

FIELD OF THE INVENTION

The present invention generally relates to seats for use in different work environments. More particularly, it relates to an adjustable ergonomic back for a seat.

BACKGROUND OF THE INVENTION

It is well known that seats in certain work environments, such as driver seats for heavy transport vehicles, like trucks or buses, or in other operator stations, require them to be efficient, ergonomic, and comfortable, especially in the cases where the drivers or operators are exposed to long periods in a seated position. Accordingly, such seats must be adjustable to the user's needs.

Lumbar supports are of particular interest since several drivers or operators suffer from back pain. Very often lumbar pain can hinder greatly the accomplishments of their operator or driver functions.

Seats having inflatable balloons at the lumbar level harden the cushion by compressing foam which changes the comfort level of the cushion. In most cases, the balloons are located behind the foam. During inflation, the balloons push against the foam which is compressed and warped locally. The foam compresses itself mainly because it remains, independently of the change it is given by the balloon, integral to the structure of the back, which does not move during the adjustment of the seat.

International laid-open application nos. WO 98/58566 and WO 98/42234 describe different lumbar supports. In these two applications, the supports comprise independent devices that are designed to be added to a seat having its own structure. The adjustment of these devices along the height of the back is only a modulation of the overall shape of the back of the seat, and thus does not meet present requirements in the designs of lumbar supports for seats.

Another type of mechanism used in this field are mechanical adjustment devices for lumbar supports. Such mechanical adjustment devices are positioned behind the foam to accentuate the lumbar curve by pressing more or less on the back of the cushion. The foam of the cushion has an initial lumbar form that the mechanical device modifies by applying an additional pressure behind the cushion. As is the case for the adjustment system with balloons, the mechanical adjustment device has the effect of compressing the foam which hardens. Examples of such mechanical devices are described in international laid-open patent applications Nos. WO 97/30613, WO 98/53723, WO 01/70075, WO 02/01988 and WO 03/039300.

Other documents describe a complete suite of lumbar support adjustment systems, which act in several directions, including those transverse to the back, along the height of the back and laterally. By way of example, reference can be made to international laid-open application WO 99/55200 by AMERICAN COMPONENTS INC. which describes a device that can be added to a seat which already has a foam and support system. Consequently all of the above-mentioned patents do not provide for a maintenance of the comfort level that is initially provided by the foam cushion after various lumbar support adjustments.

The role of a good lumbar support is to relieve any stress on lumbar vertebrae by supporting a part of the weight of the body above the waist. This is accomplished by filling the empty space left between a flat back of a seat and the spine having its natural curvature. It is very important to localize the bump in the lumbar support with respect to the top part of the curvature of the lumbar vertebrae rather than with respect to the bottom of the back, since at the same time as filling the empty space, the lumbar support must maintain the upper back in a rest position while protecting it against shocks, for example due to chaotic road conditions.

However, the lumbar support looses its efficiency if it produces pressure points that are too excessive, which is the case of traditional lumbar supports or those described in the above-mentioned patent applications. Since the problem associated with most lumbar supports is related to the fact that the foam is fixed to a frame which is then compressed under the action of a lumbar support device, the solution is to design a frame or a cushion structure support that can adjust its shape and therefore help relieve stresses on the back.

SUMMARY OF THE INVENTION

An object of the present invention is to provide an ergonomic back for a seat which satisfies the above-mentioned need.

More particularly, an object of the present invention is to provide an adjustable ergonomic back for a seat comprising:
  a plurality of back cushions, each cushion having at least one adjustment area;
  a structural shell having a plurality of voids therein;
  a plurality of thin flexible elements located between the back cushions and the structural shell, each flexible element being attached to the structural shell and having a front surface and a back surface, the front surface being in contact with a respective adjustment area of one of the plurality of back cushions; and
  a plurality of actuators located between the flexible elements and the structural shell, each of the plurality of actuators being in contact with one of the respective back surfaces of the flexible elements and exerting a pressure on said one back surface.

As may be noticed, the adjustable ergonomic back for a seat according to the invention thus comprises several flexible elements that allow adjustment of several elements of the back structure such as lumbar supports, lateral supports, upper back support as well as optionally the headrest. These flexible elements have the capacity to maintain the initial firmness of the cushions independently of the adjustments of different elements of the back structure. For each of these flexible elements, only the support of the cushion, on which it is fixed, changes shape and brings with it the cushion foam to give the desired curvature. As contrary to prior art systems, the flexible element according to the present invention does not exert pressure on the foam in order to change its shape. Since, in the present invention, it is the structure of the cushion that changes shape, the foam maintains its softness and consequently its comfort whatever be the type of adjustment that is made. The foam is only integral to the flexible structure and not to the structure of the back itself which is not adjusted.

For each of the adjustment areas of the different elements of the back, the cushion structural support comprises a thin and flexible element placed between the cushion and the structural shell of the back. The cushion structural support is deformed by an actuator located between the structural support and the shell. The actuator can be an electrical, mechanical or pneumatic actuator. The overall collection of thin flexible elements for each adjustment area collectively forms the structural support for the cushions. When using pneumatic actuators, such as balloons, the structural support protects the cushions against eventual voluntary perforations made with pointed objects traversing the cushions. The position of the actuators as well as the attachment points between each flexible thin element and the structural shell of the back are chosen at locations that provoke the desired adjustments.

A non-restrictive description of a preferred embodiment of the invention will now be given with reference to appended drawings.

DESCRIPTION OF A PREFERRED EMBODIMENT

Figure 1:
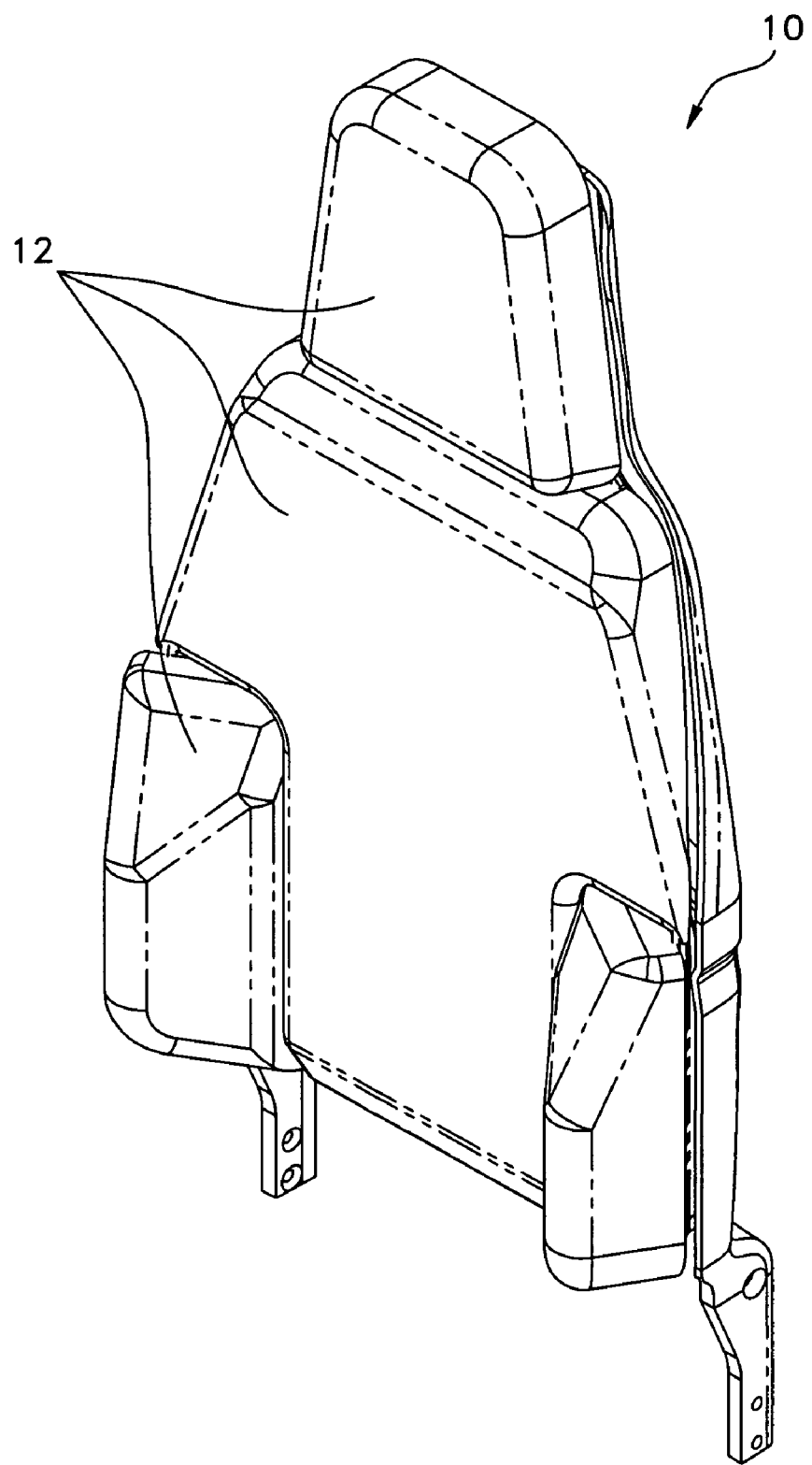
FIG. 1 is a perspective view of a back of an adjustable ergonomic seat in accordance with a preferred embodiment of the present invention.

The adjustable ergonomic back 10 for a seat according to the preferred embodiment of the invention as shown in the accompanying FIGS. 1 to 5, comprises a plurality of back cushions 12, each cushion 12 having at least one adjustment area.

The back 10 also comprises a structural shell 14 preferably having a plurality of voids therein. A plurality of thin flexible elements 16, 18, 20, 22 are located between the back cushions 12 and the structural shell 14. Each flexible element is attached to the structural shell 14 about a periphery of a respective void of the structural shell. Each flexible element 16, 18, 20, 22 also has a front surface and a back surface, the front surface being in contact with a respective adjustment area of one of the plurality of back cushions 12.

The back 10 further comprises a plurality of actuators 26, 28, 30, 32, 34 located between the elements 16, 18, 20, 22 and the structural shell 14. Each of the plurality of actuators 26, 28, 30, 32, 34 is in contact with one of the respective back surfaces of the flexible elements and exerts a pressure on the back surface.

Preferably, the adjustment areas include a lumbar support area, a lateral support area, an upper back area and a headrest area.

Figure 5:
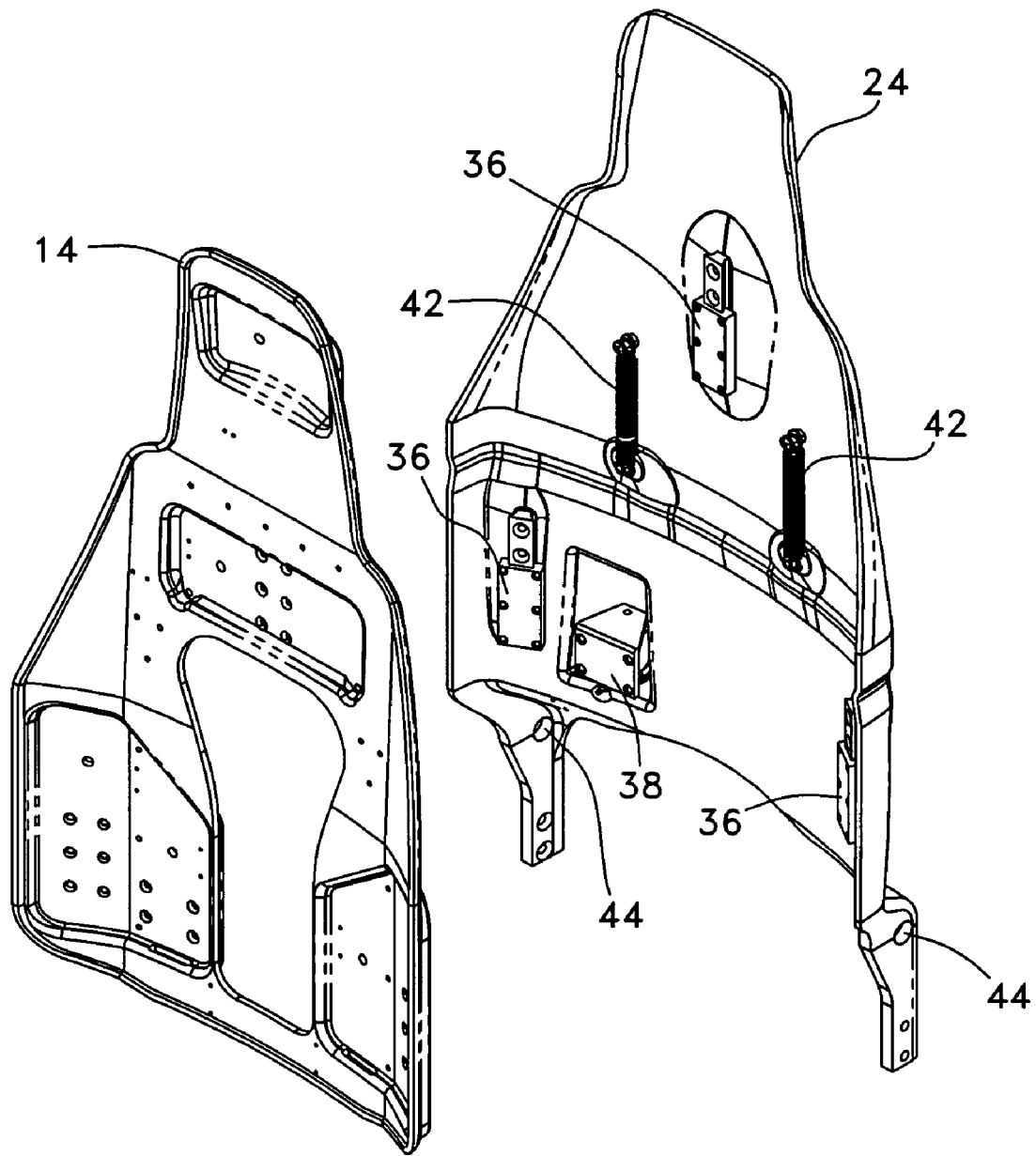
FIG. 5 is an exploded view of the structural shell and the support structure of the back of the seat shown in FIG. 1.

As shown in FIG. 5, the structural shell 14 is preferably mounted in a slidable manner on a support structure 24 through a plurality of vertical guide tracks 36 and a height adjustment actuator 38 is attached to the structural shell 14 for displacement of the shell 14 with respect to the support structure 24 along a vertical direction and for a vertical adjustment of the lumbar support area.

Preferably also, the actuators are pneumatic actuators. The actuators could however be also electrical actuators.

Figure 3:
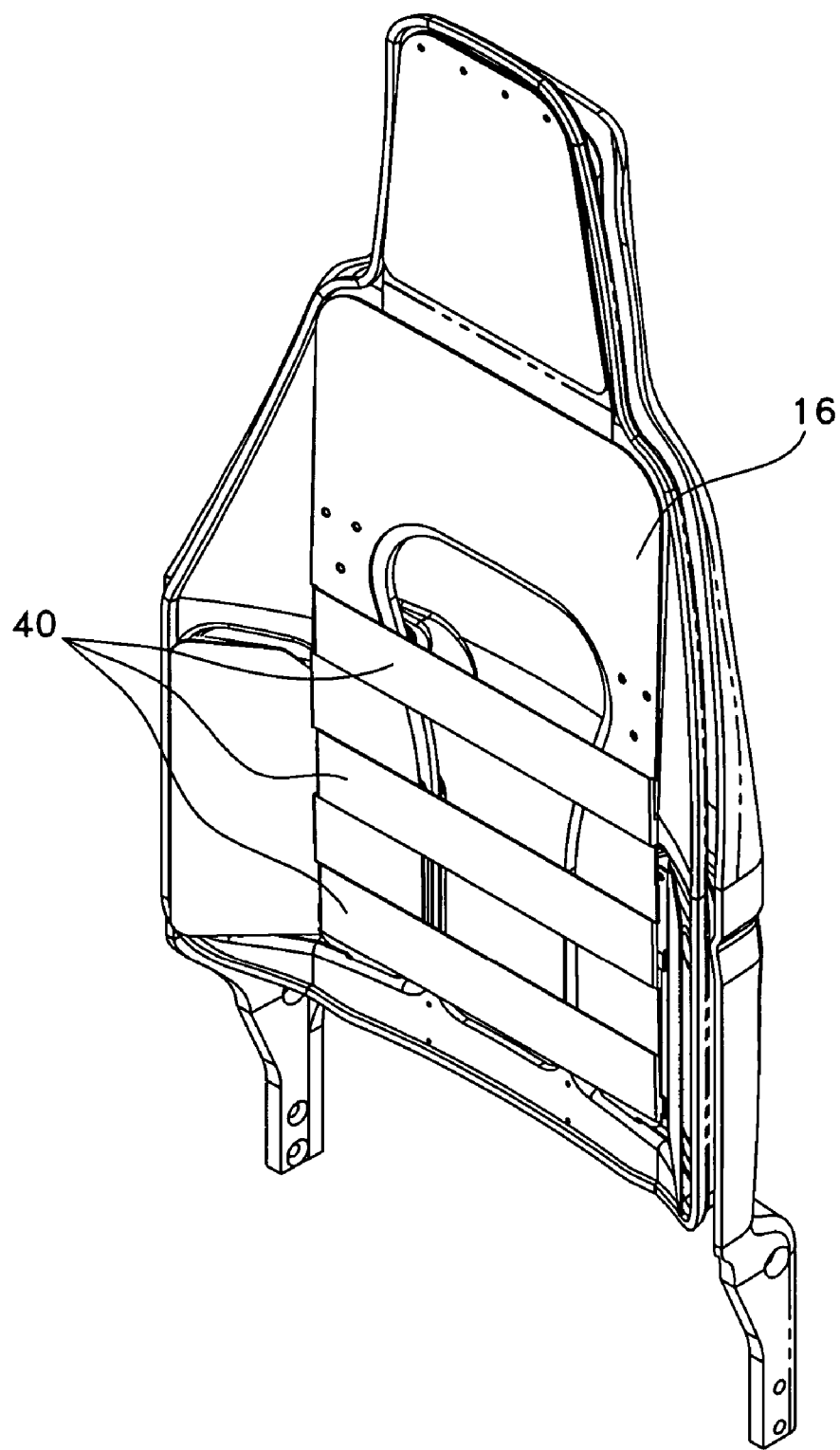
FIG. 3 is a perspective view of the back of the seat shown in FIG. 1 without the cushions, showing the elastic bands of the central elastic element of the lumbar support.

As shown in FIG. 3, the back 10, preferably further comprises two leaf springs located on opposite sides of the lumbar support area and a central elastic element 40 extending between the two leaf springs and being integral therewith. A lower extremity of the leaf springs are slidable through two openings made at a bottom of the structural shell 14 of the back for vertical movement and adjustment of a lumbar curve.

Preferably, the central elastic element 40 comprises elastic bands extending between the two leaf springs. Advantageously, the elastic element may also comprise flexible leaves extending between the two leaf springs.

Therefore, the back cushions are supported by thin flexible elements forming an integrated cushion structural support which can be deformed for adjustment purposes and the cushions are fixed to the structural support in a matter to integrally follow the deformation without compressing the cushion foam. The actuators as well as the attach point between each thin flexible element and the structural shell of the back are located at positions that provoke the desired adjustments.

Figure 2A:
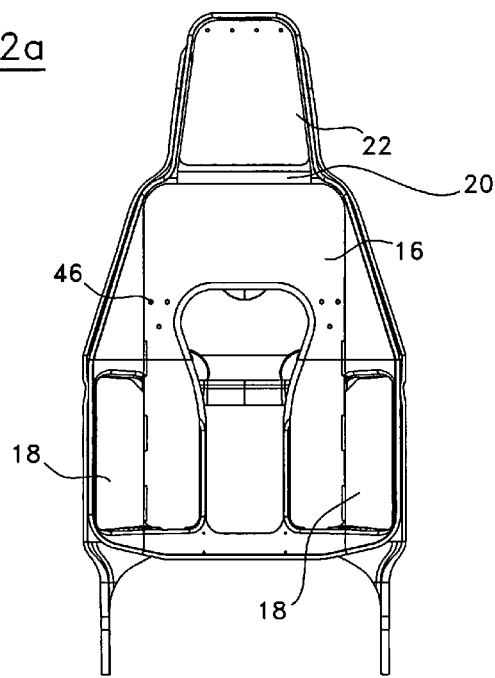
FIGS. 2a and 2b are front and side views of the back of the seat shown in FIG. 1 without the cushions and showing the assembly of the flexible cushion supports.
Figure 2B:
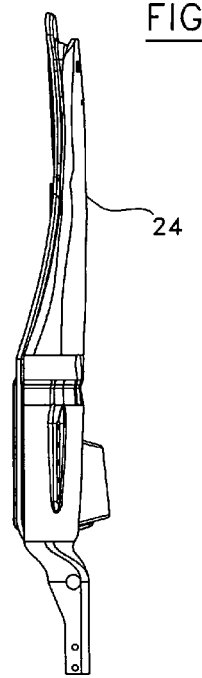
Figure 4:
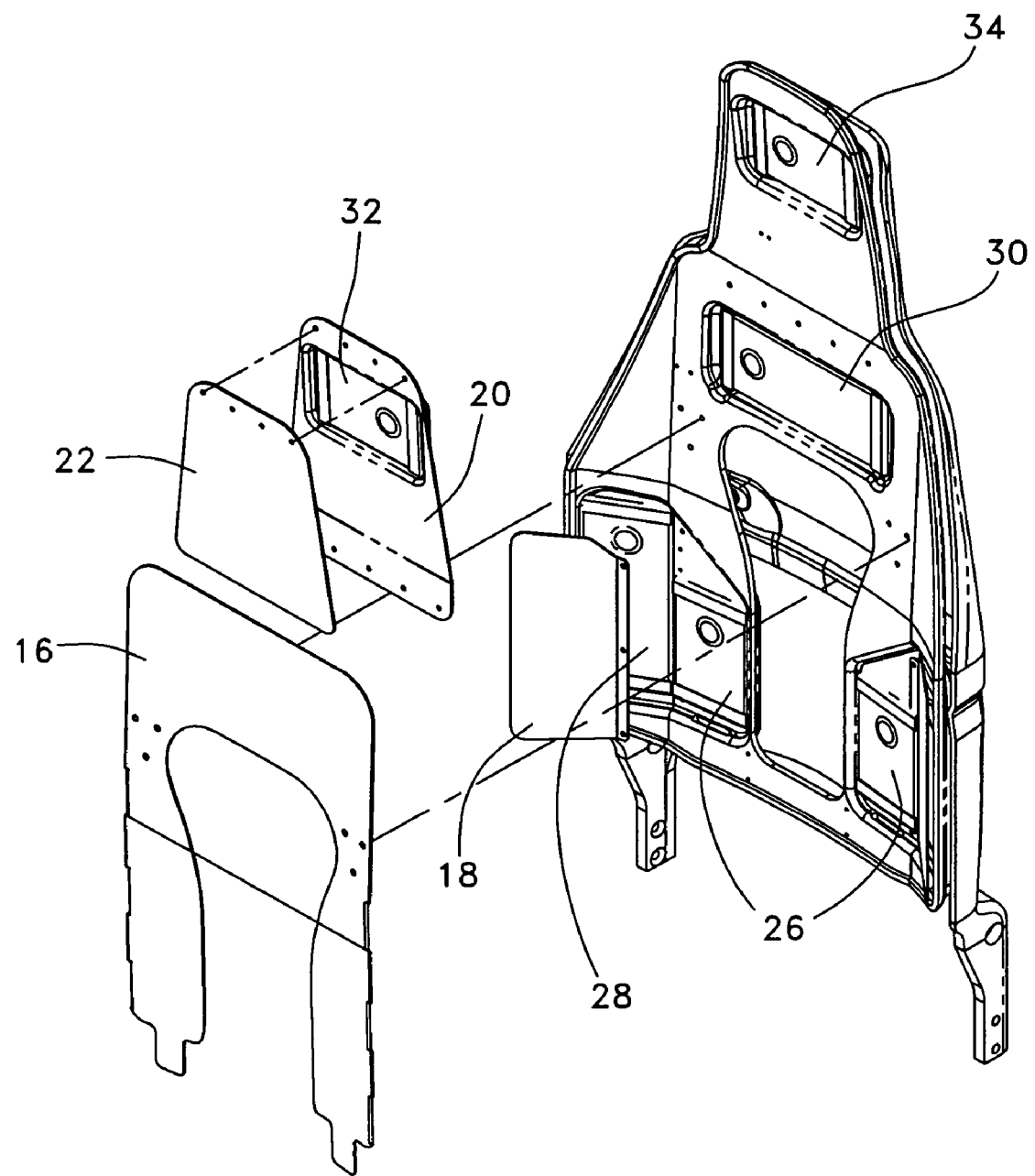
FIG. 4 is an exploded view of the back of the seat shown in FIG. 1 showing the assembly of the flexible support and pneumatic actuators.

FIGS. 2, 4 and 5, show that the flexible thin elements 16, 18, 20, 22 placed between the cushions 12 and the structural shell 14 of the back 10. Each of the flexible elements 16, 18, 20, 22 is assembled and connected to the structural shell 14 of the back 10 through rivets, glue or bolting at certain locations 46 where deformations are initiated. These deformations are preferably initiated by pneumatic actuators such as balloons 26, 28, 30, 32, 34.

Referring more particularly to FIG. 4, the two balloons for the headrest 32, 34 are installed one on top of the other but are separated by one of the thin flexible elements 20 which supports a second thin flexible element 22. This configuration in the form of a Z allows greater travel and parallel displacement of the headrest for balloons having a same dimension and therefore results in similar bending of the thin flexible elements.

Together with the top extremity of the thin flexible element 16, the balloon 30 forms the adjustment area support for the upper back. The second balloon 28 forms with the thin flexible element 18 the adjustment means for the right lateral support. Finally, the other balloons 26 form with the two other lower extremities of thin flexible element 16 and the leaf springs, adjustment in the transverse direction with respect to the back for lumbar support.

As shown in FIG. 3, a lumbar support is preferably built in order to offer a central elastic element behind the cushion, for the purpose of replacing an additional thickness of foam which is not desired for compactness considerations. This element comprises integral elastic elements having two leaf springs located vertically on each side of the back. These leaves are deformed by the actuators located between the leaves and the structural shell 14 of the back 10 and position the cushion 12 to form a lumbar curve. The elastic elements between the two leaf springs support the cushion in the central elastic zone as being integral with the leaves, the elastic elements follow the deformation produced by the actuators without creating additional tension since the foam of the cushion is already positioned on the sides by the two leaf springs. The advantage of the invention is to maintain for any lumbar support adjustment the same elastic characteristics of the cushions supports that are required to maintain comfort. Additionally, in order to obtain a curve for the lumbar support, the non-fixed extremity of the leaf springs is slidable along an opening at the bottom of the structural shell of the back in order to allow vertical displacements only. The lumbar support therefore comprises a central elastic element that does not change its firmness no matter what the adjustment of the support is made in a transverse direction with respect to the back 10.

Preferably elastic bands 40 are attached to the cushion support to support the cushion 12 in the central elastic zone.

Referring to FIG. 5, adjustment along the height of the back 10 can be achieved with a pneumatic actuator 38 of which the attachment angle can be seen. The structural shell of the back 14 is guided through three tracks 36 and attached to two hellicoidal springs 42. All of the height adjustment device is located between the structural shell of the back 14 and the back support structure 24 linking the back 10 of the seat to the bottom of the seat through two pivot points 44.

Hence, the invention also provides particular adjustment of the height of the lumbar support. In order to ensure a proper lumbar support, the lumbar curve of the back must be well positioned along the height according to the body shape of the occupant of the chair in order to well support the weight of the body above the waistline and therefore to relieve stresses on the lumbar vertebrae, in rest positions as well as in dynamic shock situations. To accomplish this, the adjustment of a lumbar support is made through vertical movement of all of the back part of the chair which consequently positions all the other adjustable elements of the seat in accordance with the high or low positioning of the occupant in the seat. Other adjustments are provided for lateral support, upper back support as well as the headrest. These adjustment movements along the height of the chair is accomplished through an actuator which interacts with the structural shell of the back and another structural element, which acts as a support for the back and which ensures the setting of the angle of the back through an inclination about a common pivot between the back and the base of the seat. These two structural elements, the structural shell of the back and the back support are also linked through a slider system.

In accordance with a preferred embodiment of the present invention, actuators are located between the structural shell of the back and the thin flexible elements that support the back cushions, as well as the actuator for adjustment of the height of the back are pneumatic. The flexible support structure for the cushions comprises thin flexible elements: one or two for the headrest, two for the lateral support and one acting at the same time as lumbar support and as upper-back support. The central elastic zone of the lumbar support comprises elastic bands stretched between the two leaf springs which form the two sides of the lumbar support. The filling foam is separated into three sets of cushions that are separately wrapped: a central cushion, a headrest cushion and two lateral cushions. The central cushion is fixed to the flexible support with the help of a hook and loop fabric fastener like Velcro™.

In accordance with the same preferred embodiment, the structural shell of the back and the back support are made with composite materials. The thin flexible elements of the cushion structural support also are made of composite materials or of shape-memory materials having a very good resistance in bending, one example of such material being polypropylene. However, the two leaf springs of the lumbar support and therefore any thin flexible element used to support the upper back are made of fibrous composite materials in order to avoid creeping caused by permanent solicitation of the elastic bands located in that area of the back.

Of course, numerous modifications could be made to the preferred embodiment of the invention as described above without departing from the scope of the present invention as claimed hereinafter.

The invention claimed is:

1. An adjustable ergonomic back for a seat comprising:
   a) a plurality of back cushions, each cushion corresponding to at least one adjustment area;
   b) a structural shell having a plurality of voids therein;
   c) a plurality of thin flexible elements located between the back cushions and the structural shell, each flexible element being attached to the structural shell and having a front surface and a back surface, the front surface being in contact with a respective adjustment area corresponding to one of the plurality of back cushions; and
   d) a plurality of actuators located between the flexible elements and the structural shell, each of said plurality of actuators being in contact with one of said respective back surfaces of the flexible elements and exerting a pressure on said one back surface,
   wherein the at least one adjustment area includes a lumbar support area and the structural shell is slideably mounted on a support structure through a plurality of vertical guide tracks and a height adjustment actuator is attached to the structural shell for displacement of the shell with respect to the support structure along a vertical direction and for a vertical adjustment of the lumbar support area.

2. The adjustable ergonomic back for a seat according to claim 1, wherein the at least one adjustment area further includes a lateral support area and an upper back area.

3. The adjustable ergonomic back for a seat according to claim 2, which further comprises a headrest area.

4. The adjustable ergonomic back for a seat according to claim 3, wherein said headrest has two balloons attached thereto as actuators, and which are installed one on top of the other and separated by one of the thin, flexible elements.

5. The adjustable ergonomic back for a seat according to claim 1, wherein the actuators are pneumatic actuators.

6. The adjustable ergonomic back for a seat according to claim 5, further comprising: e) two leaf springs located on opposite sides of the lumbar support area; and f) a central elastic element extending between the two leaf springs and being integral therewith, said two leaf springs having lower extremities that are slidable through two openings made at a bottom of said structural shell of the back for vertical movement and adjustment of a lumbar curve.

7. The back for a seat according to claim 6, wherein the central elastic element comprises elastic bands extending between the two leaf springs.

8. The back for a seat according to claim 6, wherein the central elastic element comprises flexible leaves extending between the two leaf springs.

9. The adjustable ergonomic back for a seat according to claim 5, wherein the pneumatic actuators are balloons.

10. The adjustable ergonomic back for a seat according to claim 1, wherein the actuators are electrical actuators.

11. The adjustable ergonomic back for a seat according to claim 10, further comprising: e) two leaf springs located on opposite sides of the lumbar support area; and f) a central elastic element extending between the two leaf springs and being integral therewith, said leaf springs having lower extremities slidable through openings made at a bottom of said structural shell of the back for vertical movement and adjustment of a lumbar curve.

12. The adjustable ergonomic back for a seat according to claim 11, wherein the central elastic element comprises elastic bands stretched between the two leaf springs.

13. The adjustable ergonomic back for a seat according to claim 11, wherein the central elastic element comprises flexible leaves between the two leaf springs.

14. The adjustable ergonomic back for a seat according to claim 1, wherein the actuators are mechanical actuators.

15. The adjustable ergonomic back for a seat according to claim 1, wherein each of the flexible elements is assembled and connected to the structural shell at locations were deformations are initiated.

16. The adjustable ergonomic back for a seat according to claim 15, wherein said each of the flexible elements are connected by rivets, glue or bolting.

17. The adjustable ergonomic back for a seat according to claim 1, wherein said plurality of back cushions comprise three sets of separately wrapped cushions comprising a central cushion, a headrest cushion and two lateral cushions.

18. The adjustable ergonomic back for a seat according to claim 1, wherein the structural shell is made of composite materials.

19. The adjustable ergonomic back for a seat according to claim 1, wherein the thin flexible elements are made of composite or shape-memory material.

20. The adjustable ergonomic back for a seat according to claim 19, wherein the thin flexible elements are made of polypropylene.

* * * * *